June 14, 1966 E. S. GILCHRIST 3,256,492
APPARATUS FOR SEQUENTIALLY AMPLIFYING A PLURALITY OF INPUT POTENTIALS
Filed Oct. 14, 1963
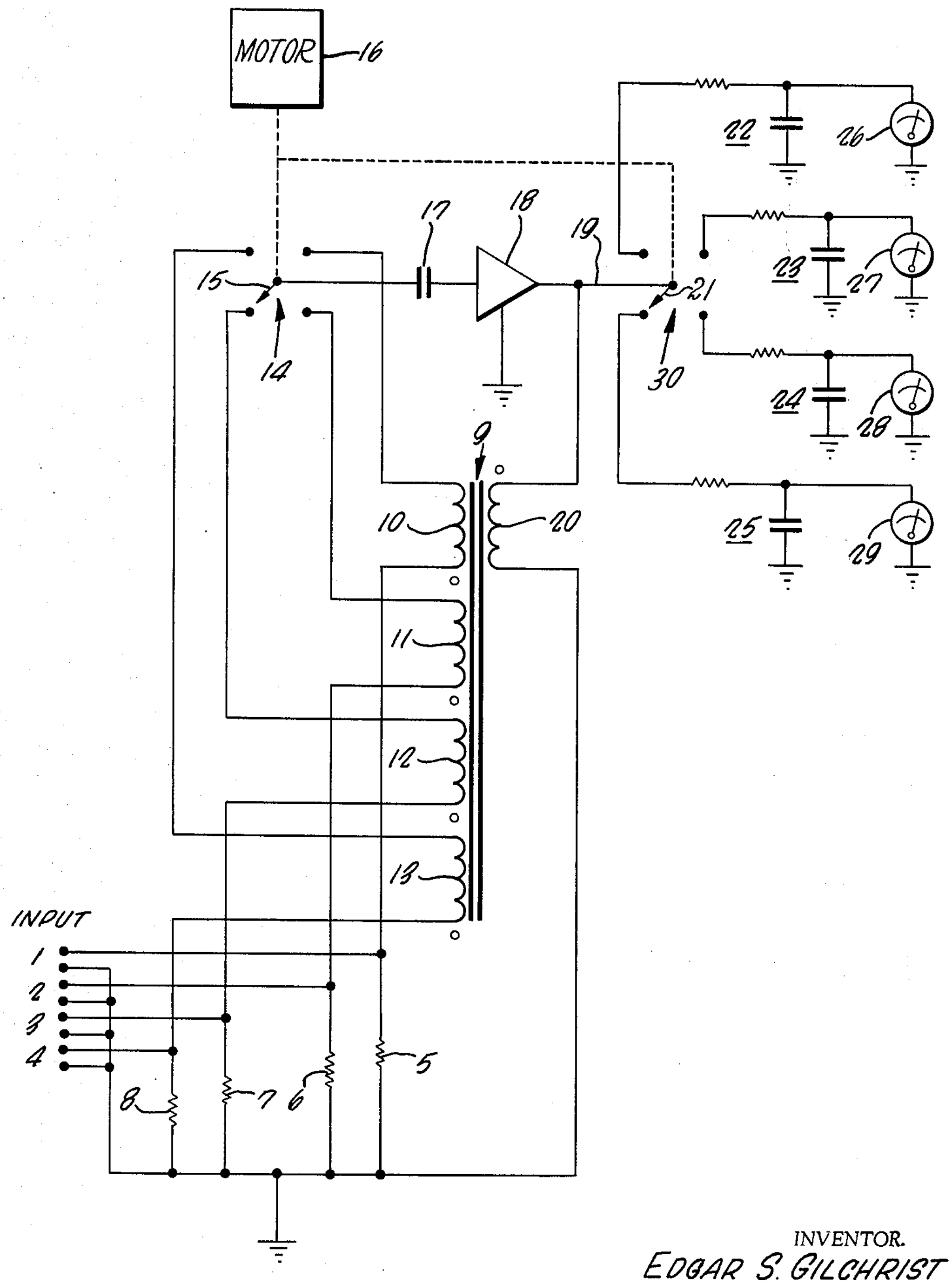
INVENTOR.
EDGAR S. GILCHRIST
BY
Christie, Parker & Hale
ATTORNEYS.

3,256,492

APPARATUS FOR SEQUENTIALLY AMPLIFYING A PLURALITY OF INPUT POTENTIALS

Edgar S. Gilchrist, Fairfield, Conn., assignor to Consolidated Electrodynamics Corporation, Pasadena, Calif., a corporation of California Filed Oct. 14, 1963, Ser. No. 316,008
4 Claims. (Cl. 330—108)

This invention relates to potentiometric measuring circuits and, more particularly, is concerned with apparatus for amplifying and measuring a plurality of input potentials.

In copending application Serial No. 282,715, filed May 23, 1963, in the name of the same inventor as the present application, there is described a transformer arrangement for providing the function of a potentiometer while avoiding problems inherent in the use of a potentiometer. The present invention is directed to a means of utilizing a single transformer in place of a plurality of potentiometers where multiple potentials are being measured.

It is common practice to use a plurality of potentiometers to adjust the level of a plurality of D.C. input potentials such as derived from a plurality of transducer elements or the like, commutating the signals to apply the signals over a common transmission link and then decommutating the signals to separately measure each of the signals at a remote point. Potentiometers are required in order that the time-shared signal sent over the common transmission link is of substantially constant magnitude so that any amplifiers in the transmission link do not saturate. The commutating and decommutating arrangement at the same time provides a means of chopping the input signal to the transmission link so that A.C.-coupled amplifiers may be used.

The present invention provides an arrangement by which a single amplifier can be time shared in amplifying and transmitting a plurality of channels of information and utilizing a single transformer for controlling the relative magnitude of the signals derived from each of the input channels and applied to the time shared amplifier.

In brief, the present invention comprises a transformer having a plurality of primary windings and a secondary winding. Each primary winding is series connected with the potential being measured. An A.C.-coupled amplifier has its output connected across a secondary winding in the transformer. Commutating means connects each of the primary windings and series connected input potentials momentarily and in sequence across the input of the amplifier. Decommutating means on the output of the amplifier directs the time shared signals into separate output channels.

For a more complete understanding of the invention, reference should be had to the accompanying drawing wherein the single figure is a schematic block diagram of a circuit incorporating the features of the present invention.

Referring to the drawing in detail, a circuit is shown which, by way of example only, accommodates four input channels indicated at 1, 2, 3 and 4. Each channel has a pair of input terminals, one of which is connected to a common ground. The other terminal of each input channel is connected across an input resistance, such as indicated at 5, 6, 7 and 8 respectively for the four inputs. One end of the input resistors is connected to the common ground. The other end of each input resistor is connected to one end of a primary winding of a transformer, indicated generally at 9. Thus the resistor 5 is connected to a primary winding 10, the resistor 6 is connected to a primary winding 11, the resistor 7 is connected to a primary winding 12, and the resistor 8 is connected to a primary winding 13.

The other end of each of the primary windings 10–13 is connected respectively to four contacts of a commutator device 14, indicated by way of example as a motor driven, mechanically switching commutator in which a rotary wiper contact 15 momentarily and in sequence contacts a plurality of input contacts to which the primary windings are connected. The wiper contact may be driven by a motor 16. While a mechanical rotating commutator has been shown, by way of example, it will be understood that any type of commutating device may be used, including high speed commutating devices utilizing transistor switches for example.

The wiper contact 15 is coupled through a coupling capacitor 17 to the input of an A.C.-coupled amplifier 18. The output of the amplifier 18 is connected to a secondary winding 20 of the transformer 9. The other end of the secondary winding 20 is returned to the common ground. The winding 20 is connected to provide degenerative feedback between the output of the amplifier 18 and the input applied to the commutator 14 through each of the primary windings.

The amplifier 18, which is time shared by all the input signals, thus transmits a series of amplified pulses at the output over a suitable transmission link shown as a single conductor 19, but which may be a telemetering transmission link or other suitable transmission means as may be required for a particular measurement situation.

The transmitted signal is applied to a decommutator, indicated generally at 30. As shown in the figure, the decommutator 30 may again be a mechanical switching device incorporating a rotating wiper contact 21 which is rotated by the same motor 16 or otherwise synchronized with the rotation of the commutator 14. The decommutator 30 thus connects the output of the amplifier 18 and transmission link 19 to a plurality of output terminals momentarily and in succession as the wiper contact 21 is rotated. Each of the output signals of the decommutator 30 may be integrated by suitable resistance-capacitance integrating circuits as indicated respectively at 22, 23, 24 and 25, to demodulate the pulse amplitude modulated signals derived from the output of the amplifier 18. These signals, developed across the output of the integrators, may be measured by suitable D.C. potential measuring means, shown by way of example, as voltmeters, indicated at 26, 27, 28 and 29 respectively.

From the above description, it will be recognized that apparatus for measuring potentials derived from a plurality of sources may be measured utilizing a single amplifier on a time shared basis and utilizing a single transformer to equalize the level of the signals derived from the several channels as applied to the amplifier 18. By varying the turns in the respective primary windings, any desired ratio can be provided between the level of the input signals and the level of the output signals applied to the respective indicators. Thus, the need for mechanical potentiometers for adjusting the level of each of the input channels is avoided. The adjustment of the turns ratio between the respective primary windings and the secondary windings of the transformer 9 provides an accurate and highly stable means of controlling the voltage ratio of the input to output levels of the respective channels.

What is claimed is:

1. Apparatus for amplifying a plurality of D.C. potentials of different magnitudes comprising a transformer having a plurality of primary windings and a secondary winding, means for connecting each of the input potentials in series with a different one of the primary windings, an A.C.-coupled amplifier, first commutating means for connecting each of the series connected input potentials and primary windings in sequence across the amplifier input, the output of the amplifier being connected across the secondary winding of the transformer, a plurality of integrating circuits, and second commutating means synchronized with the first commutating means for connecting the output of the amplifier to each of the integrating circuits in sequence.

2. Apparatus for amplifying a plurality of D.C. potentials of different magnitudes comprising a transformer having a plurality of primary windings and a secondary winding, means for connecting each of the input potentials in series with a different one of the primary windings, an A.C.-coupled amplifier, and first commutating means for connecting each of the series connected input potentials and primary windings in sequence across the amplifier input, the output of the amplifier being connected across the secondary winding of the transformer.

3. Apparatus comprising a transformer having a plurality of primary windings and a secondary winding, a plurality of pairs of input terminals for receiving input signals, one end of each winding being connected to one terminal of a different one of said pair of input terminals, an amplifier having a pair of input terminals and a pair of output terminals, the other terminal of each of said signal receiving pair of terminals being connected to one of the amplifier input terminals, means for connecting momentarily and in sequence the other end of each of the primary windings to the other input terminal of the amplifier, the secondary winding being connected across the output terminals of the amplifier, a plurality of pairs of output terminals, and means for coupling momentarily and in sequence each pair of output terminals to the output terminal of the amplifier, said last named means being operated in synchronism with means for connecting the primary windings to the amplifier input such that one primary winding and one pair of output terminals are connected to the amplifier at the same time.

4. Apparatus comprising a transformer having a plurality of primary windings and a secondary winding, a plurality of pairs of input terminals for receiving input signals, one end of each winding being connected to one terminal of a different one of said pair of input terminals, an amplifier having a pair of input terminals and a pair of output terminals, the other terminal of each of said signal receiving pair of terminals being connected to one of the amplifier input terminals, and means for connecting momentarily and in sequence the other end of each of the primary windings to the other input terminal of the amplifier, the secondary winding being connected across the output terminals of the amplifier.

References Cited by the Examiner

UNITED STATES PATENTS

| | | | |
|---|---|---|---|
| 2,817,079 | 12/1957 | Young | 328—104 X |
| 3,070,663 | 12/1962 | Searcy | 179—15 |
| 3,135,832 | 6/1964 | Feingold et al. | 240—183 X |
| 3,188,394 | 6/1965 | McMillan et al. | 340—183 X |
| 3,199,043 | 8/1965 | Hinricks | 330—147 X |

ROY LAKE, *Primary Examiner.*

R. P. KANANEN, *Assistant Examiner.*